United States Patent
Grimm (10) Patent No.: US 10,489,263 B2
(45) Date of Patent: Nov. 26, 2019

(54) METHOD FOR OPERATING A CONTAINER TREATMENT SYSTEM WITH FAULT DIAGNOSIS

(75) Inventor: Volker Grimm, Wenzenbach (DE)

(73) Assignee: KRONES AG, Neutraubling (DE)

( * ) Notice: Subject to any disclaimer, the term of this patent is extended or adjusted under 35 U.S.C. 154(b) by 994 days.

(21) Appl. No.: 14/112,416

(22) PCT Filed: Apr. 5, 2012

(86) PCT No.: PCT/EP2012/056335
§ 371 (c)(1),
(2), (4) Date: Jun. 17, 2014

(87) PCT Pub. No.: WO2012/143252
PCT Pub. Date: Oct. 26, 2012

(65) Prior Publication Data
US 2014/0298100 A1  Oct. 2, 2014

(30) Foreign Application Priority Data
Apr. 18, 2011 (DE) .......... 10 2011 017 448

(51) Int. Cl.
*G06F 11/34* (2006.01)
*B65C 9/40* (2006.01)
(Continued)

(52) U.S. Cl.
CPC .......... *G06F 11/3409* (2013.01); *B29C 49/78* (2013.01); *B65B 57/00* (2013.01);
(Continued)

(58) Field of Classification Search
CPC .......... G06F 11/3409; G05B 23/0235; G05B 19/4184; B65B 57/00; B65B 3/00;
(Continued)

(56) References Cited

U.S. PATENT DOCUMENTS 5,121,467 A * 6/1992 Skeirik ............... G05B 13/029
706/10
5,566,092 A * 10/1996 Wang ................ G05B 19/4184
700/159
(Continued)

FOREIGN PATENT DOCUMENTS

DE        4447288       7/1995
DE        2006029001    1/2007
(Continued)

OTHER PUBLICATIONS

D. Troupis, S. Manesis, N. T. Koussoulas, and T. Chronopoulos; Computer Integrated Monitoring, Fault Identification and Control for a Bottling Line, Systems and Control Division Department of Electrical Engineering, University of Patras, 1995 IEEE pp. 1549-1556.

*Primary Examiner* — Nathaniel C Chukwurah
*Assistant Examiner* — Mobeen Ahmed
(74) *Attorney, Agent, or Firm* — Onello & Mello, LLP (57) ABSTRACT

Method for operating a container treatment system (1), wherein containers are treated in a first predefined fashion with a first treatment device (2) of this container treatment system (1), are subsequently transported from this first treatment device (2) to a second treatment device (4) of the container treatment system (1) and are subsequently treated in a second predefined fashion by the second treatment device (4), wherein a first multiplicity of first reference characteristic values (RK1), which are characteristic of the treatment of the containers (10) the first treatment device (2), is recorded by means of first sensor devices (22*a*, 24*a*), and a second multiplicity of second reference characteristic values (RK2), which are characteristic of the treatment of the containers (10) with the second treatment device (4), is recorded by means of second sensor devices (42*a,* 44*a*), and wherein these reference characteristic values (RK1, RK2)
(Continued)

are stored in a memory device (16). According to the invention, the reference characteristic values (RK1, RK2) are registered with a time value which is characteristic of the chronological occurrence of the respective reference characteristic value (RK1, RK2), and a multiplicity of test characteristic values (PK1, PK2) is recorded, and at least one information item (I), which is characteristic of the determination of a present or future fault state of the system, is output on the basis of comparison between at least one of these test characteristic values (PK1, PK2) and at least one reference characteristic value (RK1, RK2).

19 Claims, 6 Drawing Sheets

(51) Int. Cl.

| | | |
|---|---|---|
| G05B 19/418 | (2006.01) | |
| B67B 3/26 | (2006.01) | |
| B67C 3/00 | (2006.01) | |
| G05B 23/02 | (2006.01) | |
| B65B 57/00 | (2006.01) | |
| B29C 49/78 | (2006.01) | |
| B65B 55/00 | (2006.01) | |
| B65B 65/08 | (2006.01) | |
| B65B 3/00 | (2006.01) | |
| B65B 55/04 | (2006.01) | |

(52) U.S. Cl.
CPC ............... B65C 9/40 (2013.01); B67B 3/26 (2013.01); B67C 3/007 (2013.01); G05B 19/4184 (2013.01); G05B 23/0235 (2013.01); B65B 3/00 (2013.01); B65B 55/00 (2013.01); B65B 55/04 (2013.01); B65B 65/08 (2013.01); Y02P 90/14 (2015.11)

(58) Field of Classification Search
CPC ......... B65B 65/08; B65B 55/04; B67C 3/007; B29C 49/78; B65C 9/40; B67B 3/26; Y02P 90/14
See application file for complete search history.

(56) References Cited

U.S. PATENT DOCUMENTS

| | | | | |
|---|---|---|---|---|
| 5,718,852 A | * | 2/1998 | Campbell | B29C 49/42 264/40.1 |
| 6,494,017 B1 | * | 12/2002 | McGrath | B65B 7/2835 53/282 |
| 8,251,201 B2 | | 8/2012 | Finger | |
| 8,311,774 B2 | * | 11/2012 | Hines | G06F 11/30 702/182 |
| 8,417,432 B2 | * | 4/2013 | Butler | G05B 23/0281 701/100 |
| 8,442,673 B2 | | 5/2013 | Langosch et al. | |
| 8,494,826 B2 | * | 7/2013 | Richards | G05B 17/02 703/7 |
| 8,505,268 B2 | | 8/2013 | Stoiber et al. | |
| 8,620,853 B2 | * | 12/2013 | Herzog | G06K 9/6215 706/52 |
| 8,751,413 B2 | * | 6/2014 | Nagathil | G06N 7/023 706/1 |
| 9,104,650 B2 | * | 8/2015 | Hosek | G05B 19/41875 |
| 9,157,832 B2 | * | 10/2015 | Uluyol | G01M 13/045 |
| 9,256,224 B2 | * | 2/2016 | Herzog | G05B 23/0283 |
| 2006/0291491 A1 | | 12/2006 | Sakata et al. | |
| 2007/0067678 A1 | * | 3/2007 | Hosek | G05B 23/0235 714/25 |
| 2008/0243434 A1 | * | 10/2008 | Boutin | B65B 57/00 702/179 |
| 2009/0205448 A1 | | 8/2009 | Grimm | |
| 2010/0059331 A1 | * | 3/2010 | Finger | B65G 43/00 198/341.09 |
| 2010/0152889 A1 | * | 6/2010 | Langosch | B65C 9/06 700/230 |
| 2010/0241247 A1 | * | 9/2010 | Attarwala | G05B 19/4063 700/21 |
| 2011/0056610 A1 | | 3/2011 | Koller et al. | |
| 2011/0061347 A1 | | 3/2011 | Stoiber et al. | |
| 2012/0226376 A1 | | 9/2012 | Haesendonckx et al. | |
| 2013/0125509 A1 | * | 5/2013 | Sowislo | B67C 3/007 53/396 |
| 2013/0228025 A2 | | 9/2013 | Grimm | |
| 2013/0309343 A1 | | 11/2013 | Stoiber et al. | |
| 2014/0076476 A1 | | 3/2014 | Koller et al. | |

FOREIGN PATENT DOCUMENTS

| | | |
|---|---|---|
| DE | 102006059001 | 6/2008 |
| DE | 2008010014 | 8/2009 |
| DE | 2009035924 | 2/2011 |
| DE | 2009040977 | 3/2011 |
| DE | 2009040803 | 4/2011 |
| EP | 2196398 | 6/2010 |
| EP | 2295326 | 3/2011 |

* cited by examiner

METHOD FOR OPERATING A CONTAINER TREATMENT SYSTEM WITH FAULT DIAGNOSIS

The present invention relates to a method for operating a container treatment system. Such container treatment systems have been known from the prior art for a long time. Usually, these are systems made up from a plurality of different units, which comprise for example blow moulding machines for moulding plastic preforms into plastic containers, labelling units, filling machines, sterilisation units and the like.

For a trouble-free operation of such systems it is not only necessary for the individual units of these systems to be matched to each other, but they also have to operate in an error-free manner by themselves. It is therefore conceivable that an error in a certain part of the system will not have an effect until in a later system part and may lead to system failures there.

In practice, the machine operator can, based on their experience, often predict in the case of a certain fault being present, which system part has caused the actual fault. Whilst such faults only occur sporadically, however, they sometimes occur with a certain probability. If for example containers are always produced and transported at a particularly high rate and as a result many containers are present in a transport unit such as on a belt, failures may occur in a downstream system such as for example in a labelling machine.

The present invention is therefore based on the object of providing a method and an apparatus which facilitate or respectively enable such a fault diagnosis. According to the invention, this is achieved by means of a method according to claim 1 as well as a container treatment system according to claim 15. Advantageous embodiments and developments are the subject matter of the dependent claims.

In a method according to the invention for operating a container treatment system, containers are treated by means of a first treatment device of this container treatment system in a first predefined manner, are subsequently transported from this first treatment device to a second treatment device of the container treatment system and are subsequently treated by the second treatment device in a second predefined manner.

Further, first sensor units are used to record a first plurality of first reference characteristic values which are characteristic of the treatment of the containers using the first treatment device. Moreover, second sensor units are used to record a second plurality of second reference characteristic values, which are characteristic of the treatment of the containers using the second treatment device. The recorded reference characteristic values are stored in a storage device.

According to the invention, the reference characteristic values are recorded together with a time value that is characteristic of the respective occurrence of the respective reference characteristic value, and a plurality of test characteristic values is taken. Further, at least one piece of information is output as a result of a comparison between at least one of these test characteristic values and at least one reference characteristic value, which is characteristic of the determination of a present or a future condition and in particular of a fault condition of the system.

However, it would also be possible to output information relating to other conditions of the system, such as for example energy consumption, output, maintenance intervals and the like.

The term reference characteristic values covers here also (measurement) signals that can be recorded or detected, which may be characteristic of (reference) characteristic values. Thus, it is possible for a sensor unit to record a certain measurement signal that is characteristic of a reference characteristic value, so that the reference characteristic value is recorded at least in an indirect manner. However, it would also be possible to record (measurement) signals instead of reference characteristic values.

Preferably, the signals or respectively reference characteristic values recorded are deposited together with further information. Thus, meta information may be deposited in relation to the signals. Depending on the configuration and the signal, for example, information deposited as this kind of information may be information that describes an associated location such as a position, a machine or an area of a machine or of a system or the like. Moreover, information in relation to a name of a machine or a material to be processed or information in relation to a certain unit or a data type may be deposited.

In addition, however, also characters or figures may be allocated, which in turn have associated therewith certain statements. Thus, for example, the numeric value 1 may denote a certain type of beer.

Moreover, further meta data may be read out from an operation information system. If for example a certain signal is characteristic of a certain container cap, the information about the manufacturer of this container cap may be determined from the information system, and in this way the information about the signal may be further refined. Thus, the mentioned signal has the refined meaning that it designates a certain cap that comes from a certain manufacturer.

The time value may be an absolute time value, however, it would also be possible for just a relative time value to be associated with the reference characteristic values, which relative time value allows a temporal placement of the reference characteristic value in relation to other reference characteristic values, for instance the statement that a certain reference characteristic value was recorded in time before or after another reference characteristic value and/or within a certain time window.

Advantageously, the container treatment system is controlled whilst taking into account this information. Thus, for example, the speed of a treatment device may be reduced or increased on the basis of this information, or for example also an alarm signal may be output to a machine operator.

It is therefore proposed that the reference characteristic values are gathered in particular over a longer period of time, particularly preferably also permanently. Further, during working operation, the test characteristic values are advantageously also determined on a permanent basis and are compared with the reference characteristic values. Thus, for example, if a certain test characteristic value or group of test characteristic values deviates, conclusions can be made in respect of error or fault conditions in the system. It is also possible to determine by means of this comparison if certain irregularities occur in the system which will result in a fault with a certain probability.

According to the invention it is therefore proposed to artificially imitate human experience that detects, on the basis of a certain present condition, where a fault is expected to be.

For example, in the case of a certain value, a conclusion can be made in relation to a fault in a preceding system. However, it would also be possible to draw a conclusion, on the basis of a certain current value, with regard to future faults in this or another system part.

Advantageously, many or all of the machine data is particularly preferably collected by a control system, for example, a manufacturing system (MES) and/or line diagnosis system (LDS), so that it is then for example possible to record, on a permanent basis, the machines speeds, the number of containers on a transport belt, the output values of jam switches, temperatures, machine types, consumables of different manufactures etc. In case a fault occurs, this can be detected via said machine conditions.

The term characteristic value as mentioned above, such as reference- and test characteristic values, may refer to any characteristic values or signals that are characteristic of the system. These may both be characteristic values that directly relate to the containers, such as for example symmetric dimensions of the containers, temperatures of the containers, material properties of the containers and the like, and characteristic values that relate to the respective system part, such as for example transport speeds, torques, temperatures as well as environment variables which can hardly if at all be influenced, such as air humidity, illuminance and the like. Also, the characteristic values may relate to the medium that is filled into the containers, such as for example a temperature of the liquids and the like.

In a further advantageous embodiment, at least one of the mentioned devices for treating the containers on the basis of the determined test characteristic values is open or respectively closed loop controlled. In this context, a fault condition of the system is preferably understood to mean any deviation from a desired condition, i.e. not necessarily a fault that will directly lead to a failure of the system.

It is further proposed that all of the recorded reference characteristic values are preferably at least partially considered in general to be overall information or respectively an overall picture, in order to teach in this way an artificial intelligence of the machine on the basis of this data. More specifically, a neural network can be provided that is designed as or respectively behaves like a self-learning system. Moreover, also so-called support vector machines (SVM) may be used. Such an SVM divides a number of objects or respectively data into categories in such a way that a margin as wide as possible remains free of objects around the category boundaries. The starting point for providing an SVM is a number of objects for which it is respectively known what category they belong to. Each object is here represented by a vector in a vector space.

A teach-in process for the treatment system may here be carried out automatically or semi-automatically. Further it is possible for the pattern search in present data to be carried out by means of this neural network or the SVM. If for example a certain pattern of test characteristic values or a certain test characteristic value is found that has already led to a fault at previous times, the user's attention can be drawn to the fact that a certain machine is likely to develop a fault or respectively will fail in the near future. As a result of the fact that the reference characteristic values are linked with the time values it will also be possible to associate certain faults of the system with certain test or reference characteristic values in retrospect.

The reference characteristic values are here not just automatically acquired signals from sensors, but they may in addition be simple and calculated values from controllers. In this respect, for example, drives will also interpret rotary encoders or similar elements as sensor units. This information, i.e. the automatically acquired signals from sensors, simple and calculated values from controllers and the like, will advantageously be associated with one, several or all machines.

Advantageously here, at least one test characteristic value and at least one reference characteristic value is determined by means of the same sensor unit.

In a further advantageous embodiment, the test characteristic value and the reference characteristic value are determined by means of a sensor unit that is associated with the first or the second treatment device, and the information that is characteristic of the determination of the fault condition is related to the second or first treatment device. This means that a certain fault condition, i.e. the deviation of a certain present condition from a desired condition, occurs for example in a treatment device, however, a fault will not occur until in a further treatment unit.

In general the information will therefore advantageously be output in relation to a machine other than the machine in which the fault occurred. If for example a fault occurs during the treatment of a certain container on a downstream machine, it is possible to check, taking into account the time duration, whether an error has already occurred on a certain upstream machine during the treatment of this particular container. It would also be possible that in the case of a fault occurring on a certain machine, a plurality of further machines which are alternatively or cumulatively responsible for this fault is identified.

In a further advantageous method, a plurality of test characteristic values is recorded. Therefore, predictions are no longer made on the basis of just one test characteristic value, but on the basis of a plurality of test characteristic values which may in cooperation lead to a certain statement (which may be used for finding a fault). Also, a plurality of test characteristic values is compared with a plurality of reference characteristic values, in order to be advantageously able to derive in this way a prognosis about fault conditions. Advantageously, the test characteristic values are continuously compared during a working operation with reference characteristic values, in order to determine fault conditions. It is also possible here to adapt reference characteristic values to machine situations or respectively to change them during working operation.

In a further advantageous method, test characteristic values and/or reference characteristic values are logically linked to each other for outputting the information. It may thus for example be possible for a certain fault to be likely to occur only in the case of several circumstances occurring such as, for example, if a transport speed of the containers exceeds a certain limit value and at the same time the containers have a certain geometric shape. As a result of this logical linking of the test characteristic values, several test characteristic values, for example also from different sensor units, may be used for outputting the information.

In a further advantageous method, the reference characteristic values are selected from a group of reference characteristic values including (electrical) current characteristic values, voltage characteristic values (such as a mains voltage), work characteristic values (such as the work of a motor or consumed power of the machines), pressure characteristic values (e.g. a filling pressure, a blowing pressure, a pressure within a container or the like), volume characteristic values (which describe e.g. a container volume, a fill volume and/or a tank volume), temperature characteristic values (such as a hall temperature, a filling material temperature, a motor temperature and/or a machine temperature), volumetric flow characteristic values (which identify e.g. the flow of air, water, heat, oil, chemicals and/or of a product), mass flow characteristic values (such as the flow of raw materials like wheat), mass concentration characteristic values, speed characteristic values (such as transport belt speeds or speeds of the transported containers), weight values (such as for example bottle weights or package weights), pH values (such as those of water or an acid), force values (such as for example thrust forces), torque characteristic values, pulse characteristic values, power characteristic values (such as in relation to a machine power), quantity characteristic values, time characteristic values (such as e.g. the signal time of each signal, a time of day, a time zone, a day of the week or a quarter), type characteristic values (such as for example a present bottle type, container types, package types or product types), operator interventions, any other characteristic values (for example with regard to apparent power, resistance, vol, Brix, Plato, Sievert, Siemens, degree, humidity), combinations thereof and the like.

Also cycle or frequency characteristic values (such as e.g. the number of filling rounds per minute, the number of containers per hour, the number of bottles per second or the closures per hour), or ratio characteristic values (such as an percentage output or a distribution during sorting) may be determined.

Also, for example, values which relate to geometric dimensions such as lengths, widths or heights may be used as reference characteristic values. These may for example be transport belt lengths between machines, sizes of the packages and/or containers or height figures (e.g. an altitude above sea level).

Thus, information is gathered from the container treatment system, wherein advantageously any information that may be made available by sensor units or controllers is gathered.

It would further be possible to categorise this information, for example by speed information (in relation to systems and belts), in temperatures, in voltage, in current, power, work, faults, count modes and the like.

In a further advantageous method, in the case of a fault in the container treatment system, the reference characteristic values that are characteristic of this fault can be determined and stored. If for example a fault occurs, an analysis of this fault is advantageously carried out, and initially the cause of this fault is advantageously found, which will usually be one or more machines. This can thereby be carried out fully automatically. It is here preferably assumed that the fault relates to a machine or can be associated with a plurality of machines (in question).

Once the reference characteristic values associated with a plurality of different faults or error conditions have been gathered in a database and this information has preferably been stored, the system can look for abnormalities during future operation. It is also possible here to associate the information with a fault-causing machine, and preferably also an analysis for abnormalities will be carried out.

In a further advantageous method, the test characteristic values or the reference characteristic values are evaluated by means of statistic methods. To this end, advantageously statistic processes are used in order to detect patterns in the acquired data or respectively reference characteristic values or test characteristic values. If such patterns occur within a certain period of time of a fault more often than at other times, a conclusion can be made that a fault has occurred. The period of time of the fault is calculated back, in particular whilst taking into account the transport speeds, to the machine that caused it. It is also possible here to take into account the run time between the individual machines. It is further also possible to repeatedly use a certain reference characteristic value and to fix a mean value, as a result of which it can be checked by means of a comparison with this mean value, whether a certain test characteristic value falls within the predetermined normal range.

In a further advantageous method, a test characteristic values determined on an upstream device at an earlier point in time is associated with a certain test characteristic value determined on a downstream device.

If for example a certain fault is determined on a downstream machine, a predetermined time will be taken into account during which the container was treated using the preceding machine, and the corresponding value for this preceding machine will be determined.

Advantageously here, also the run times of the containers between the treatment devices are taken into account.

It is also possible here that the calculated periods of time are searched with a certain degree of fuzziness, i.e. not only exact points in time are checked, but also periods of time around these points in time. Also the acquired test characteristic values are searched with a predetermined degree of fuzziness. Apart from that, advantageously not only the information of the machine causing the fault, but also that of neighbouring machines is searched. However here, too, a degree of fuzziness will preferably be taken into account again.

Further, also so-called heuristics may be used, i.e. experience-based techniques for solving problems. This, too, may be used for influencing the values or respectively the degrees of fuzziness.

If the system or respectively the treatment system has detected certain patterns, then these patterns will be learned. If these patterns occur (more frequently) in the reference characteristic values, i.e. in the information stream, then corresponding actions may be triggered, such as for example a warning may be output to the machine operator.

On many machines and for many patterns, levels of "suspicious patterns" may be defined, the occurrence of which will cause the level to rise or which respectively indicate a certain fault situation. This level may be visualised and is used as a warning to the operator in relation to what degree of criticality the treatment system is or respectively runs under at that moment in time.

In a further preferred method, the system may also analyse patterns and may develop improvement strategies for the user. In this context, both semi-automatic and fully automatic approaches may be contemplated. If certain patterns are for example detected in individual categories, such as for example an increased frequency of the faults at higher speeds, the system can calculate an optimal speed. Patterns are here advantageously understood to be a plurality of test characteristic values. In this context, the test characteristic values and reference characteristic values adopted in this way from the container treatment system are continuously used as a feedback of the control unit and as information for the pattern search. If clear patterns of a fault are detected, the system can also intervene and can for example reduce the speeds for a short time, so that a possible fault will be prevented beforehand from occurring. In this way, predictive fault elimination is realised.

It is also possible here that not only information of a category needs to be evaluated for the patterns or faults, but also a combination of different values may be involved, on the basis of which the presence of a fault is detected. If for example the speed on a certain belt is high, the number of bottles on this belt is low and the bottles are further of a certain type (for example 0.5 PET), then an increased number of faults will occur. As a result of this large amount of information, the patterns are automatically searched and linked, wherein advantageously also heuristics are integrated. Advantageously, as mentioned above, also methods of artificial intelligence are used in order to detect the patterns. The methods can be automatically learned by way of fault analysis.

In a further advantageous embodiment, the treatment system has at least three devices for treating containers. Advantageously, at least one treatment device is selected from a group of devices comprising moulding devices for moulding plastic preforms into plastic containers, filling devices for filling containers, transport devices for transporting containers, sterilisation devices for sterilising containers, closing devices for closing containers with caps, labelling devices for labelling containers, combinations thereof and the like.

As mentioned above, in the case of an association of test characteristic values to reference characteristic values, a level of fuzziness is advantageously taken into account. Therefore, advantageously a so-called fuzzy logic is used wherein, as mentioned above, this level of fuzziness can be taken into account both in relation to the period of time and also in relation to the recorded values.

As a result of the approach described here, an improvement of the machines and systems is achieved by detecting faults and the causes thereof even in the presence of a large number of system parts cooperating with each other. This information can be used to detect general fault frequencies of certain machine types and machine configurations. A frequency of faults per machine type can provide indicators for developing further improvements and may also result in quality indicators. Further, a service, for example also a network-based service, may be provided for the system optimisations, which can suggest specific improvements to a machine operator on the basis of fault analyses. The improvement may for example also be a note saying that consumables from a certain supplier only allow a limited degree of efficiency to be achieved.

Advantageously, also faults in container treatment, such as for example during the filling operation, can be recorded and stored as a result of an operation data collection. It is also possible here for the faults to be automatically detected by the respective system operators. If a fault that exceeds a certain limit value (e.g. a system downtime of more than 10 minutes) occurs on a certain system, an error log is advantageously created which also lists the faults that occurred in the upstream system components, moreover also advantageously operating conditions of the treatment system as well as further information. Advantageously, this log is machine-readable and can be communicated to a system manufacturer by electronic means.

By means of this information, the causes of the fault may be detected. This can be carried out using certain methods and depends on a master machine, a machine process in flow production, the type of fault (deficiency, jam, inherent fault etc.) and the time of the occurrence. The machine manufacturer can associate the faults or respectively error conditions and the operating conditions of the respective system components (for example by means of the Commission numbers) and can thus determine a list of the most frequent fault causes per machine type. This information can advantageously be linked to SAP in order to compile a consistent data inventory.

These fault frequency lists may further provide clues about systematic weak points of the machines and can therefore indicate possibilities for improvements. Thus, a continuous process of improvement may be initiated and then pursued or respectively measured. Also quality characteristic values may be created over a large number of machines, in order to find the weakest machine in the system.

In a preferred procedure of the method proposed here, initially the reference characteristic values or respectively signals can be recorded, in particular by reading them in on a cyclic basis. Subsequently, the acquired data may be compressed, but the information content of the data is preferably retained. In a further method step, the data can be stored in particular in a database management system.

Within the context of an analysis, for example a machine condition such as a fault of a master machine can be detected. Also, the cause of such a fault can be detected (both in the case of an inherent fault of this machine and in case the fault is caused by an upstream machine). It is possible here for the analysis to determine the reference characteristic values or signals respectively needed for this analysis, and this determination can be carried out over a predetermined temporal and/or spatial range. In this way, a distinction can be made for each individual machine in relation to a time axis between the occurrence of a fault and a fault-free operation. In this way, a time range for a cause can be determined whereby also the run time between two or more machines can be taken into account. Within the context of the analysis of the machine, also the signal information associated with the machine and the range thereof may be analysed within the temporal environment or respectively range of the fault. Moreover, it can also be checked whether a certain fault or a certain group of faults occurs more frequently, e.g. as a function of a production condition or a resting condition of the machine.

It is also possible to indicate certain accumulations. If significant accumulations (correlations) occur between signals or respectively characteristic values, these can be indicated.

Thus, for example, the information that the faults mostly occur between 10 o'clock and 11 o'clock may be output.

Advantageously, these results are evaluated by humans. For example, it could turn out that a packaging machine causes most downtimes between 8 and 10 o'clock in the morning and that more system faults occur at temperatures above 30°. It is now down to the operating personnel to analyse and eliminate this condition.

Moreover, on the basis of the method according to the invention, the system may also be controlled semi-automatically or fully automatically.

If it has for example been determined that there is an accumulation of the faults of machine x, if signal or respectively characteristic value 1 has a certain level and a certain tendency and if signal or respectively characteristic value 2 has a certain level, then this can be formulated as follows:

Signal 1(level,tendency) and signal 2(level)→machinex(tendency performance drop)

On the basis of the relationships found, the user indicates possibilities as to how the signals can be controlled for the power drop. This means the user can communicate the admissible control to the system. The system can be used to determine which characteristic value the system can use in order to modify the tendency or the level of the output signals.

Thus, the software can advantageously modify the output signals, if they fall into the range that would cause a minimisation of system output.

The result analysis can also result in production being carried out, due to the operating conditions, with a reduced output, but with a higher degree of efficiency as a result.

The present invention is further directed to a container treatment system comprising a first treatment device that treats the containers in a first predefined manner, a second treatment device that is provided after the first treatment device in a transport direction of the containers and that treats the containers in a second predefined manner. Further, a first sensor unit is provided, which records at least one first reference characteristic value that is characteristic of the treatment of the containers with the first treatment device, as well as a second sensor unit that records at least one second reference characteristic value that is characteristic of the treatment of the containers with the second treatment device, as well as a storage device for storing the characteristic values, which storage device is designed in such a way that it allows an association of time values with the reference characteristic values, which time values are characteristic of the point in time or the period of time of occurrence of the reference characteristic values.

According to the invention, a comparison unit is provided, which allows a comparison of recorded test characteristic values with the reference characteristic values, as well as a processor unit that outputs, on the basis of such a comparison, at least one piece of information that is characteristic of the determination of a present or future fault condition of the system.

Therefore, it is also proposed with regard to the device to provide a system that allows an analysis of present (if necessary also past and/or future) fault conditions or the operation of a filling system for beverages with an output that does not cause an increased fault frequency.

Further advantages and embodiments will become evident from the attached drawings, wherein.

Figure 1:
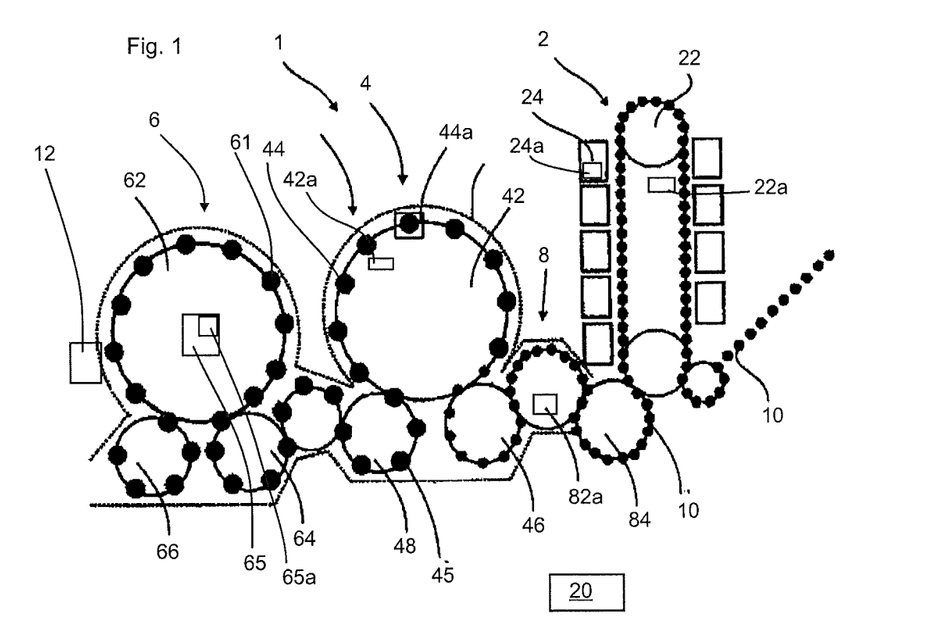
FIG. 1 shows a possible embodiment of a container treatment system according to the invention.

FIG. 1 shows a possible embodiment of a container treatment system 1 according to the invention. This container treatment system 1 thereby comprises a first treatment device 2 that treats containers 10, here plastic preforms 10. In detail, the first treatment device 2 is an oven that heats plastic preforms 10 whilst they are being passed through by means of a transport unit 22. To this end, the oven comprises a plurality of heating elements 24, which are for example infrared heating elements, but they may also be microwave units. Reference signs 22a and 24a relate to sensor units that can be used to detect variables that are characteristic of this heating process. Thus, the sensor unit 22a may be a controller of the transport unit 22, which determines in this way for example a transport speed of the plastic preforms, a dwell time in the heating unit 2 or the like. The unit 24a may for example be a temperature measuring unit that determines the temperature of the individual elements 24, or may for example also determine temperatures of the plastic preforms in a contactless manner.

After the heating process, the plastic preforms may be sterilised by means of a further treatment device 8, such as here a sterilisation device. Thus, reference sign 82a in turn refers to a sensor unit that determines for example characteristic values that are characteristic of this sterilisation process, such as for example a sterilisation atmosphere, a temperature of a sterilisation agent and the like. Reference numeral 84 identifies a supply unit that feeds the plastic preforms to the sterilisation unit 8.

Reference numeral 4 generally identifies a treatment device such as for example a moulding unit for moulding plastic preforms into plastic containers. This device may here have a plurality of moulding stations 44 which are provided here on a common carrier 42 (in particular a rotatable blow wheel) and rotate together therewith. Reference sign 42a identifies again a sensor unit that outputs for example data that is characteristic of this transport of the plastic preforms, such as for example a rotary speed, a position value and the like.

Reference numeral 84 identifies a transport star that is used to transfer the containers to the treatment device 8. Data that is characteristic of this transport can be read by means of sensor units. Reference sign 44a identifies one or more sensor units which output characteristic values that are characteristic of this moulding process, such as for example the flow of pressurised air, opening times of the individual blow air valves, pressures and the like. The plastic preforms are fed to the second treatment device by means of a supply unit 46 and are discharged therefrom by means of a discharge unit 48. Here again, gripping elements 45 may be provided which grip the plastic containers. In this context sensor units (not shown) may be provided which evaluate this transport process.

Reference numeral 6 identifies a further treatment unit, which is here a filling unit for filling the plastic containers that have by now been moulded. Here, too, a carrier 62 with a plurality of filling elements 61 is provided, as well as a drive unit 65 and a sensor unit 65a, which again acquires data that is characteristic of this treatment, such as the flow volume of the product to be filled in, a temperature of the product to be filled in and the like. Reference numeral 64 again identifies a supply star that supplies the empty containers, and reference numeral 66 identifies a discharge star that discharges the filled containers.

Reference numeral 12 identifies a further treatment device that closes for example the filled containers. This means that in addition further treatment devices may be provided, such as for example labelling means for labelling the containers, transport units for transporting the containers and the like. Reference numeral 20 relates to a control unit for controlling the container treatment system. Apart from that, the individual treatment devices may have their own control units.

It is possible here for the individual treatment devices of the container treatment system to be interlocked or respectively synchronised to each other, i.e. they run at speeds that are matched to each other. Moreover, it would be possible for buffer units to be provided between individual treatment devices, which buffer units can compensate for a short-term failure of a treatment device. These buffer units, too, may include sensor units, and the data of these sensor units can also be read out. It would thus be possible for the reference characteristic values to be numbers of containers which are currently present in the buffer unit, or to determine how the number of containers in the buffer unit changes over time.

Figure 2:
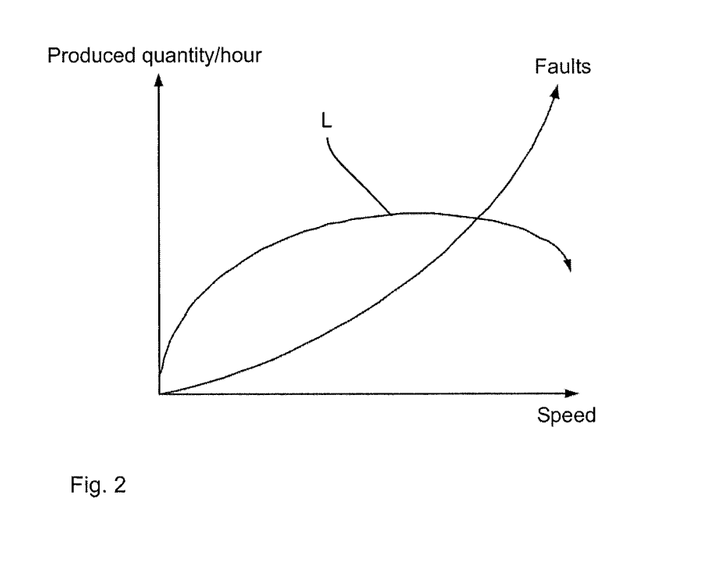
FIG. 2 shows a view for illustrating a problem that is at the basis of the invention.

FIG. 2 shows a view of the problem that is at the basis of the invention. The X axis shows a system speed, the Y axis shows the number of containers per hour actually produced. It can be seen that the produced quantity per hour rises as the speed rises. However, with increasing work speed also the number of faults rises. This means that the overall productivity of the system decreases again.

It is an object of the present invention to detect such fault relationships and to control the system so as to achieve an optimal performance.

To this end it is possible for the information of the individual sensor units or generally the container treatment system to be continuously used as control feedback for use as information for a pattern search. If for example clear patterns of a fault are detected, the system can also intervene and can for example reduce the speeds for a short time, in order to prevent a possible fault from arising in the first place. In this way, too, predictive fault elimination is realised.

Figure 3A:
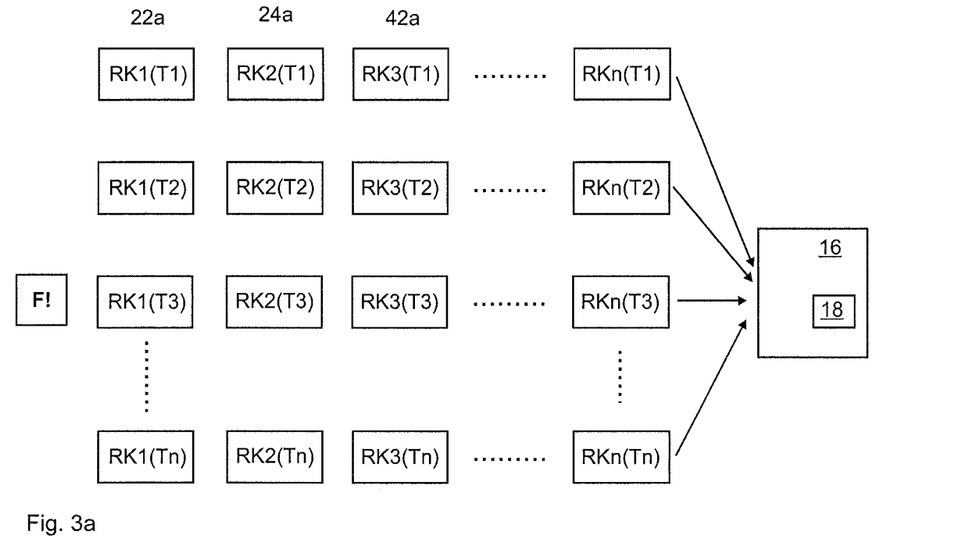
FIGS. 3a, 3b show views for illustrating the method according to the invention.
Figure 3B:
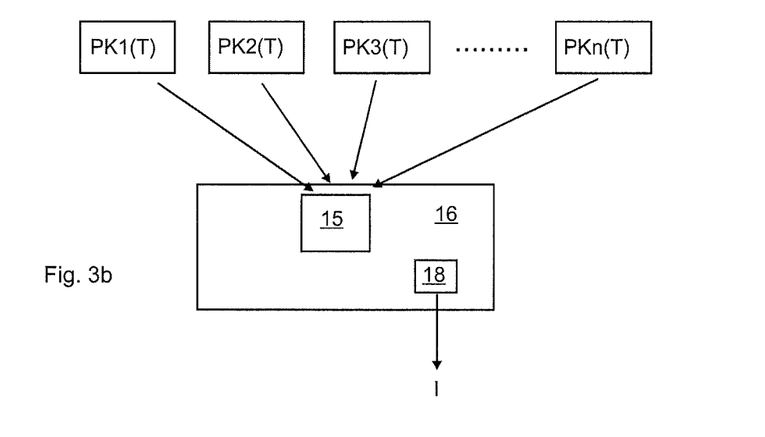

FIGS. 3a and 3b illustrate an approach according to the invention in a schematic form. During operation, data sets of the individual sensor units 22a, 24a, 42a etc. are measured on an intermittent or a continuous basis and are stored in the storage unit 16 as reference characteristic values RK1 (T1), RK2 (T1), RK3 (T1) and point RKn (T1). The individual reference characteristic values RK1 to RKn relate here to a certain time T1, at which they were measured. At a second time T2, the corresponding reference characteristic values are recorded and stored in the storage unit 16. In this way, a plurality of data sets is obtained from reference characteristic values RK1 to RKn.

Reference characteristic values RK1 (T3) to RKn (T3) are reference characteristic values that were recorded before and/or during a fault condition of the machine. It would here also be possible to record new reference characteristic values on a permanent basis and to delete old values, if necessary.

The processor unit 18 can, if desired, also associate individual reference characteristic values RK1 to RKn in such a way that they respectively relate to the treatment of the same container. For example, it would therefore be possible to associate a reference value RK2 (T3) with a reference value RK1 (T1), which relates to the same treated container.

As shown in FIG. 3b, test characteristic values PK1 (T) to PKn (T) can be recorded at a later point in time. The individual test characteristic values PK1 (T) to PKn (T) are fed into a comparison unit 15 which may here be part of the storage unit 16. In the course of these comparisons it may for example be established that these test characteristic values have a certain statistic similarity with reference characteristic values that occurred prior to a fault. Correspondingly, the information can be output to a user via the processor unit 18 and a display unit (not shown) that it has to be expected that the occurrence of a certain fault is imminent. It would also be possible for the system to respond automatically and to reduce for example an output variable of the system.

Figure 4:
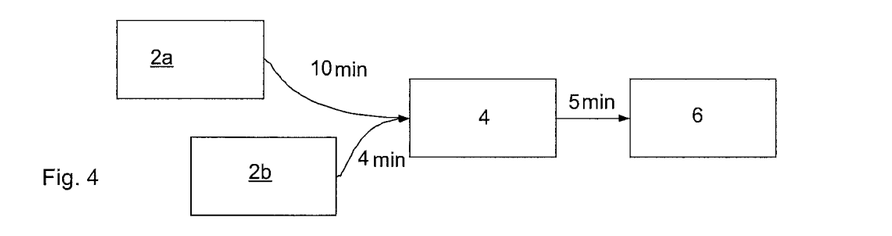
FIG. 4 shows a view for illustrating time relationships.

FIG. 4 shows a view for illustrating time relationships. For example, it is possible for the containers that are treated by a treatment device 4 to be treated five minutes later by the second treatment device 6. It can thus be established that the same containers were treated five minutes earlier by the first treatment device 2b or alternatively ten minutes earlier by a second treatment device 2a. The treatment device 2b may here for example be the oven shown in FIG. 1, and the container treatment device 2a may for example be a generating unit that generates the plastic preforms. Insofar it is possible to associate a reference characteristic value recorded at a certain point in time for example by the treatment device 4 with other reference characteristic values that occurred four or ten minutes earlier at the treatment devices 2a or 2b and that relate to the same container or the same group of containers. Apart from that it would also be possible to re-group the characteristic values shown in FIG. 3a in such a way that although they correspond to different times, they relate respectively to the same treated container or the same treated container group.

In order to enable these associations to be made it is also conceivable for the respective transport speeds of the containers to be recorded at the same time, so that an association of the individual reference characteristic values relative to each other is made possible whilst taking into account these transport speeds or an integral speed over a certain period of time.

In general, also counter values, speeds, control parameters, conditions and faults, i.e. generally automatically acquired signals of sensors, simple and calculated values from controllers and the like can be used as input signals or respectively reference characteristic values. This information can be associated with a treatment device, several treatment devices or all treatment devices. It would therefore also be possible to categorise the individual information, for example into speed values (about the system, about belts and the like), temperatures, voltages, currents, powers, work, fault conditions, counter conditions, air humidity (labels), luminance in halls (inspection machines, optical sensors), IR absorption (preforms) and the like.

Depending on the processing or respectively treatment device, different control possibilities can be contemplated. Thus, for example, a machine speed can be modified or machine parameters such as for example temperatures in the case of a blow moulding machine or pressures in the case of a blow moulding machine, the filling speeds in the case of a filling machine and the like can be modified. Also, the control possibility may consist in informing checking personnel or in rejecting consumables.

The individual measurement values, signals, control variables are respectively referred to as values or respectively reference characteristic values. One or more of such reference characteristic values again usually have an effect on other values. These effects are mostly coupled via a time relationship. The time relationship may here be a constant or it can be the result of a factor of other values, such as the machine speed.

Figure 5:
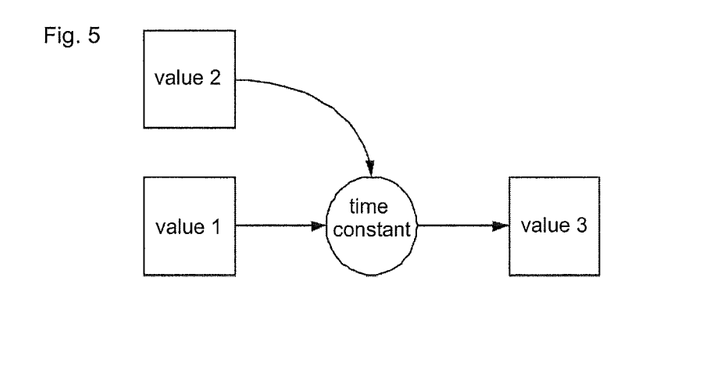
FIG. 5 shows a view for illustrating time relationships.

FIG. 5 shows a generalised illustration of this relationship. Thus, for example, input values, here referred to as value 1 and value 2, may lead in combination with each other to time-limited tendencies in other starting values, here referred to as value 3. If for example a certain value 1 and within a certain time frame additionally value 2 occur, then value 3 will result with a certain probability. In this context, values 1, 2 and 3 may occur on the same treatment device, however it would also be possible for values that occur on one treatment device to lead to certain values (value 3) on another treatment device.

The time relationship may here be a constant or may be a result achieved via a factor of other values (for example machine speed). It is possible that generally the input values in combination with each other lead to time-limited tendencies in other output values.

This relationship is explained for example in terms of the relationship between a fault in a blow moulding machine and the energy consumption of the overall system or respectively the blow moulding machine in the future. It is possible here for the real power of a blow moulding machine and the correlation with the stops to be determined by means of error or jams.

Figure 6:
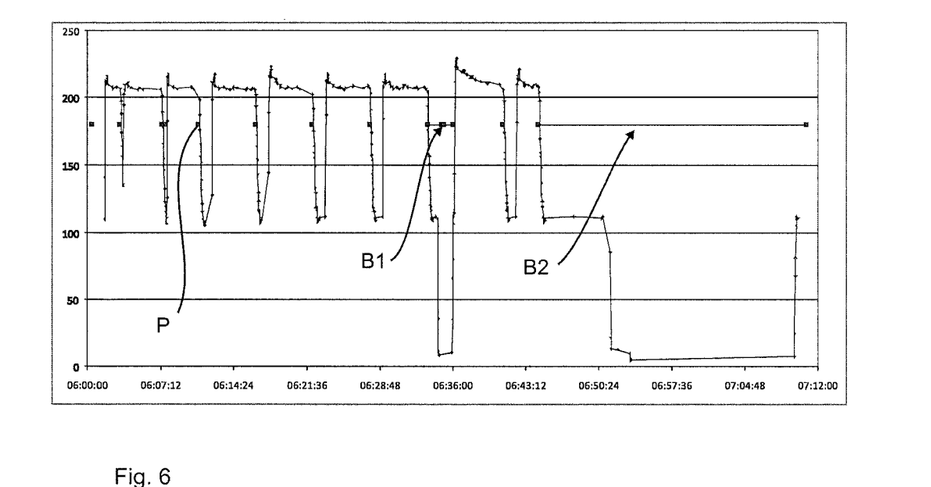
FIG. 6 shows a further view for illustrating time relationships.

FIG. 6 illustrates this relationship in a diagram. Here, the X axis shows a system time and the Y axis shows energy consumption in arbitrary units. The energy of the system or respectively the energy consumption decreases after each machine stop, here indicated by the points P. During a longer stop, as indicated by the ranges B1 and B2, the energy consumption drops down to nearly "0". Thus, there is a direct correlation here between the energy consumed and the faults occurred. In this way, a conclusion can be made from the faults of the blow moulding machine, such as for example a jam in the outlet, in relation to the energy that will be consumed in the future (mostly a few minutes later).

Figure 7A:
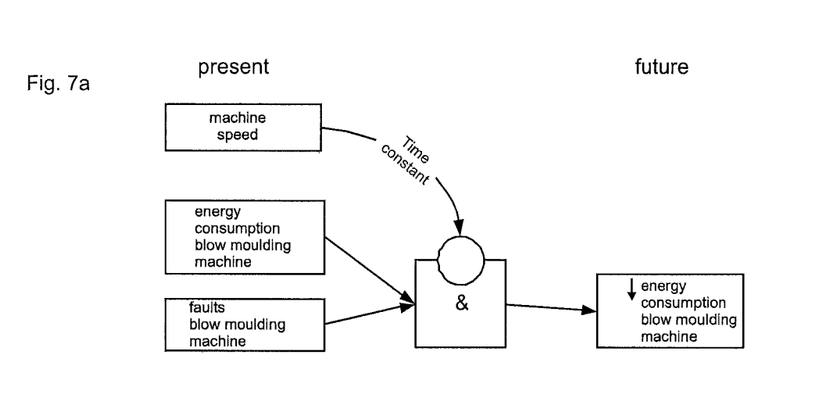
FIG. 7a-7c show three views for illustrating time relationships.

FIGS. 7a and 7c show three further examples of such relationships. As shown in FIG. 7a, it can be determined for example from the reference characteristic value of the energy consumption of the blow moulding machine and a characteristic value that additionally indicates a fault of the blow moulding machine, that the energy consumption of the blow machine will drop at a predetermined time. The time constant may here again be the result of the machine speed.

Figure 7B:
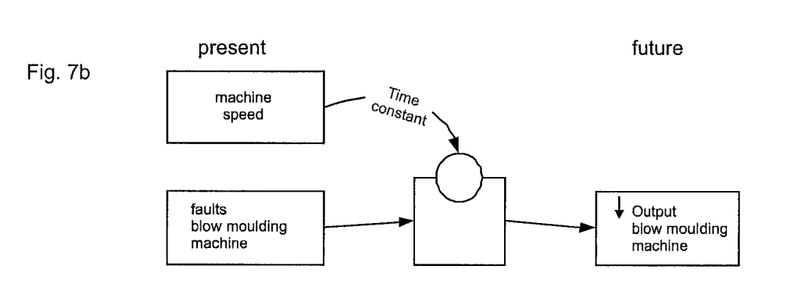

As shown in FIG. 7b, it is also possible to predict, on the basis of a reference characteristic value indicating a fault in the blow moulding machine that the production of the blow moulding machine will drop in the future. Here again, the machine speed may be used as the basis for determining a time constant.

Figure 7C:
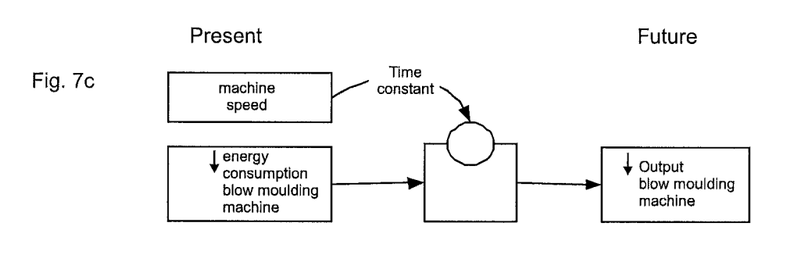

It would also be possible to provide information about a development of a production output of the blow moulding machine on the basis of an energy consumption of the machine based on a certain time constant (cf. FIG. 7c).

Figure 8A:
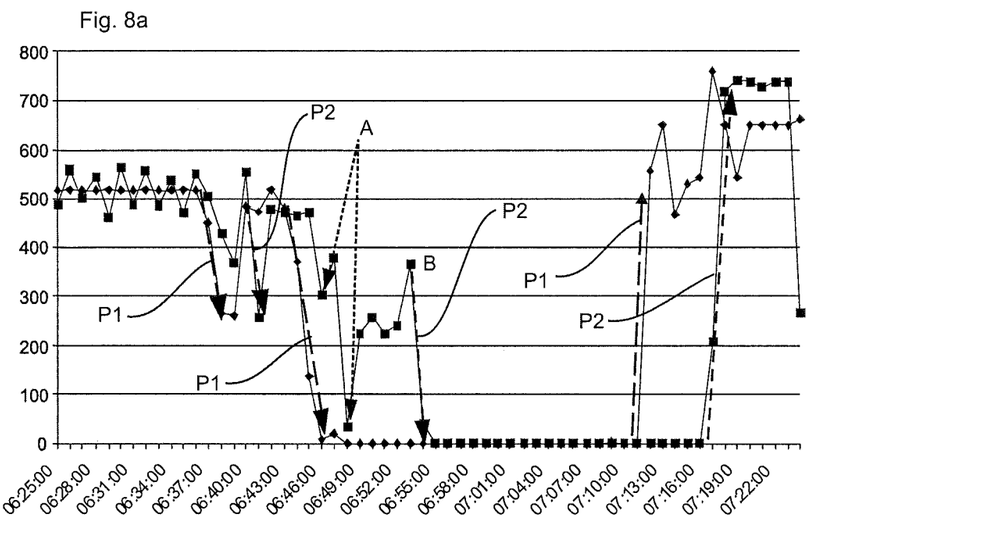
FIGS. 8a, 8b show two diagrams for illustrating a machine relationship.
Figure 8B:
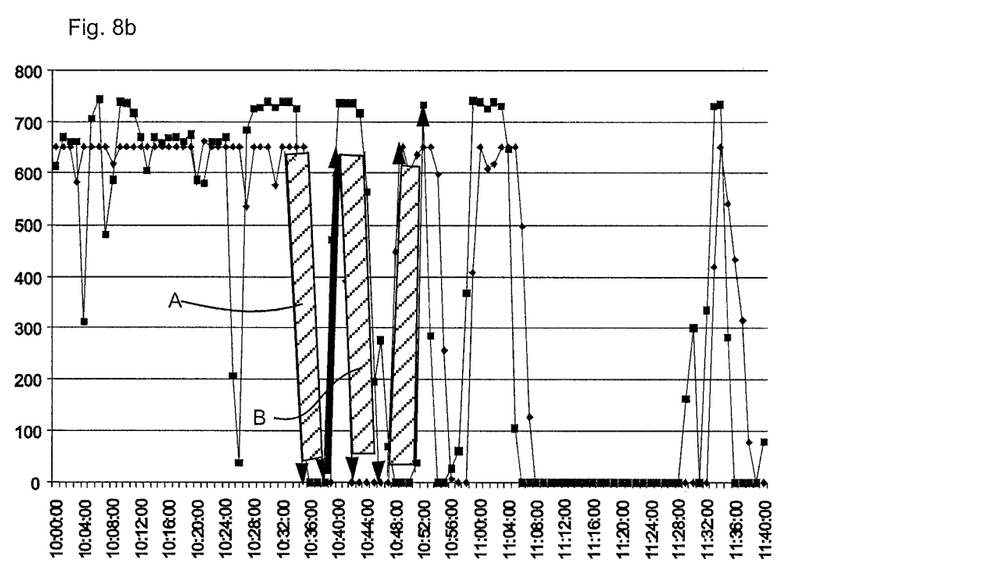

FIGS. 8a and 8b as well as 9a to 9c illustrate comparable relationships between the output of a filling machine and the output of a labelling machine. This relationship applies in particular if in the case of assembly line production of a filling system, the filling machine is disposed upstream of the labelling machine.

Figure 9A:
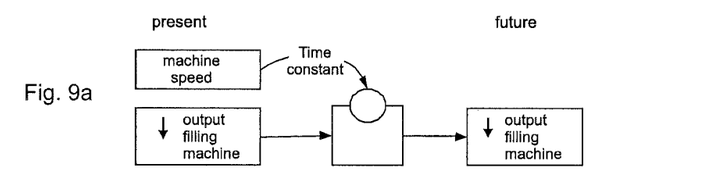
FIG. 9a-9c show two further views for illustrating time effects.

As shown in FIG. 9a, a drop in productivity of a filling machine will after a certain time or respectively time constant have an effect on the drop in output of a labelling machine. This time constant in turn is a result of the machine speed.

FIG. 8a illustrates this relationship in a time diagram. Here, the measurement values identified by squares relate to a production output of a labelling machine, and the measurement values identified with diamonds relate to the production output of a filling machine. The dashed arrows P1 respectively identify sections in which the output of the filling machine was reduced or respectively increased. After a certain period of time, which is a function of the production output, corresponding reductions or increases with respect to the labelling machine will follow (arrow P2). On the basis of this relationship, the time constants as described above can then be determined.

At the time A shown, the output of the labelling machine has unexpectedly dropped. After the time constant in this case, output should not be reduced until about six minutes later rather than as early as three minutes later. At the time B, the bottle buffer will then have been emptied. As a result of the faults at the point in time A, the delay until the drop at point in time B will be longer than the usual time of six minutes.

It would be possible here to regard the filling machine values shown as reference characteristic values and the data of the labelling machine as test characteristic values. However, advantageously some of the filling machine values shown and also some of the values of the labelling machines are respectively regarded as reference characteristic values and at least one further value, preferably a plurality of values of the filler or respectively the labelling machine, is regarded as a test characteristic value, in order to illustrate in this way the temporal progress as shown in the figure. Reference is made to the fact that in this way the individual values are also compared (on the basis of the time indications).

Figure 9B:
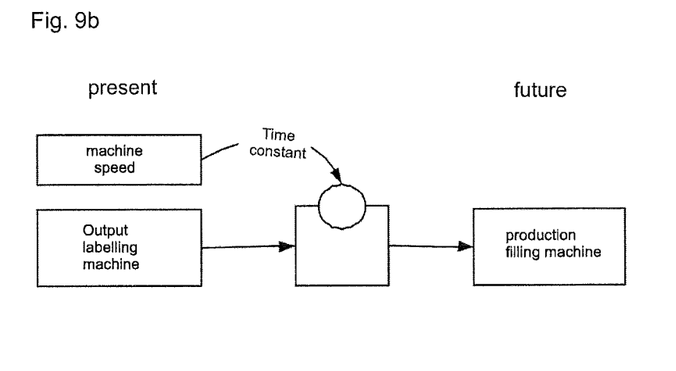
Figure 9C:
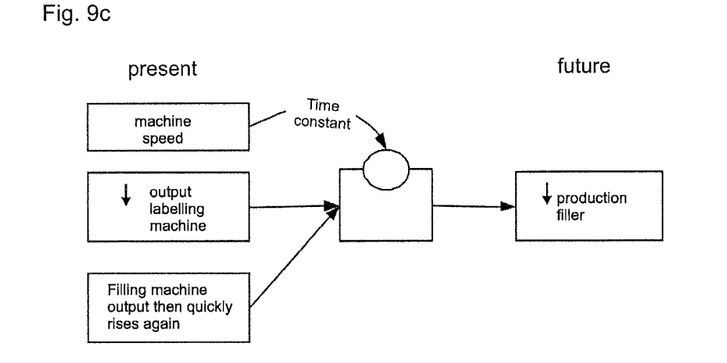

FIGS. 8b and 9b and c show that this relationship also applies inversely. At the point in time A shown in FIG. 8, the output of the labelling machine drops and the filler follows correspondingly. This relationship is explained in FIG. 9b. If the output of the labelling machine drops, the output of the filling machine will also drop after a predetermined time constant which again follows from the machine speed.

Moreover, a relationship can be established that often after a drop in output of the labelling machine and a rapid increase in the output of the labelling machine, the filler will go back into a fault condition. The relationship is shown in time section B, in which an increase in labelling machine output is followed, with a short delay, by a drop in output of the filling machine. This behaviour can be determined by means of analysing the data and can be checked.

FIG. 9c illustrates this relationship. Here, the two data elements of a drop in output of the labelling machine and a rapid increase in the output of the filling machine are linked with each other and are evaluated taking into account the time constant. As a result, the output of the filler drops.

If such a pattern of behaviour is detected on the basis of the reference characteristic values as described above, an attempt could for example be made to start the filling machine more slowly.

Figure 10:
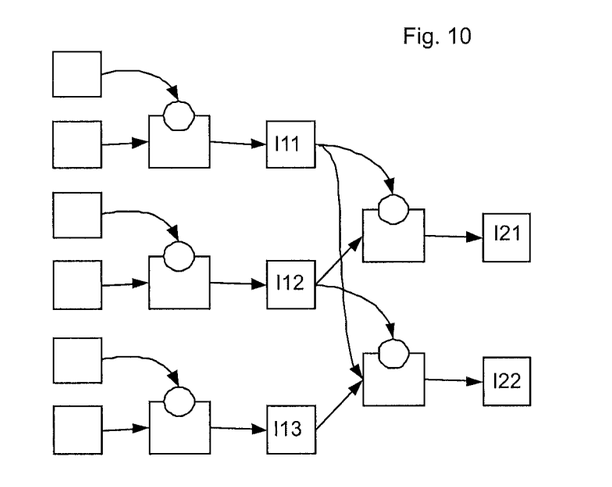
FIG. 10 shows a view for illustrating value relationships.

Further, the individual results mentioned and described above could be linked to form an overall picture. This is shown in FIG. 10 in a very schematic form. It would be possible here, as shown in the left-hand part of the picture, to link individual behaviour patterns respectively with each other and to forward, if necessary, also the results to further linking operations, for example as time constants, but also as reference characteristic values. Thus, for example, in a first step the information I11, I12 and I13 could be output and then in turn linked with reference characteristic values or with each other, in order to arrive in this way at statements 121 or 122. In this way, the small building blocks could be linked to each other and would result in a greater relationship.

Thus, the entire container treatment system can be analysed and optimised and in this way faults can be avoided. Thus, for example, energy consumptions could be predicted, faults could be avoided and the system could thus be operated in a more efficient manner. To this end it would also be possible to create corresponding algorithms or respectively to adapt these algorithms either semi-automatically or automatically during the run time of the container treatment system.

All of the features disclosed in the application documents are claimed as being essential to the invention in as far as they are novel over the prior art either individually or in combination.

LIST OF REFERENCE SIGNS

1 Container treatment system
2 First treatment device
2a Second treatment device
2b First treatment device 4 Second treatment device
6 Further treatment device
8 Treatment device (sterilisation unit)
10 Containers (plastic preforms)
12 Treatment device for labelling the filled containers
15 Comparison unit
16 Storage unit
18 Processor unit
20 Control unit
21 Transport unit
22a Sensor unit
24 Heating elements
24a Sensor unit
42 Carrier
42a Sensor unit
44 Moulding stations
44a One or more sensor units
45 Gripping element
46 Supply unit
48 Discharge unit
61 Filling element
62 Carrier
64 Supply star
65 Drive unit
65a Sensor unit for accommodating characteristic data
66 Discharge star
82a Sensor unit
84 Supply unit
PK1, PK2 Test characteristic values
RK1, RK2, RKn Reference characteristic values
T1, T2, T3 Point in Time
A, B Point in Time
P Points
B1, B2 Ranges
P1, P2 Arrows
L Power
I Information

The invention claimed is:

1. A method for operating a container treatment system, wherein containers are treated by a first treatment device of this container treatment system in a first predefined manner, are subsequently transported from said first treatment device to a second treatment device of the container treatment system and are subsequently treated by the second treatment device in a second predefined manner, wherein by means of first sensor units, a first plurality of first reference characteristic values are recorded, which are characteristic of the treatment of the containers with the first treatment device, and by means of second sensor units, a second plurality of second reference characteristic values are recorded, which are characteristic of the treatment of the containers with the second treatment device, and wherein the plurality of first and second reference characteristic values are stored in a storage unit, wherein:

the first plurality of first reference characteristic values and second plurality of second reference characteristic values are each detected and recorded with a time value that is characteristic of the temporal occurrence of a respective reference characteristic value of the first and second reference characteristic values, a plurality of test characteristic values are recorded, as a result of a comparison between at least one of said plurality of test characteristic values and at least one of said plurality of reference characteristic values at least one piece of information is output that is characteristic of the determination of a present or future fault condition of the container treatment system, at least one of the plurality of test characteristic values or the reference characteristic values relating directly to the containers are logically linked to each other for outputting the at least one piece of information, a same sensor unit of the first and second sensor units determining the at least one of the test characteristic values and the at least one of the plurality of reference characteristic values;

a linking of the first and second reference characteristic values with the time values associates the fault condition of the container treatment system with at least one of the test characteristic values to carry out an automatic or semi-automatic search of a pattern of the test characteristic values for a determination of the fault condition, and a certain test characteristic of the plurality of test characteristic values determined at a downstream device of the second treatment device has associated therewith at least one test characteristic value determined at an earlier point in time on a machine that is upstream of the downstream device of the container treatment system, wherein a performance level of the machine upstream of the downstream device is reduced or increased in response to the determination of the fault condition and a corresponding increase or decrease in a production output of the downstream device.

2. The method as claimed in claim 1, wherein at least one treatment device is controlled on the basis of the information.

3. The method as claimed in claim 1, wherein the plurality of test characteristic values and the plurality of reference characteristic values are determined by a sensor unit of the first and second sensor units that is associated with the first or the second treatment device, and the information that is characteristic of the determination of the fault condition is related to the second or first treatment device.

4. The method as claimed in claim 3, wherein the plurality of test characteristic values is compared with the plurality of reference characteristic values.

5. The method as claimed in claim 1, wherein the plurality of test characteristic values are continuously compared with the plurality of reference characteristic values.

6. The method as claimed in claim 1, wherein a number of the plurality of test characteristic values are logically linked with each other for outputting the information.

7. The method as claimed in claim 1, wherein the plurality of reference characteristic values are selected from a group of reference characteristic values which includes current characteristic values, voltage characteristic values, temperature characteristic values, speed characteristic values, torque characteristic values, pulse characteristic values, power characteristic values, quantity characteristic values, temporal characteristic values, combinations therefrom.

8. The method as claimed in claim 1, wherein in the case of a fault in the container treatment system, the plurality of reference characteristic values that are characteristic of the case of the fault are determined and stored.

9. The method as claimed in claim 1, wherein the plurality of test characteristic values are evaluated using a statistic method to detect patterns occurring within a predetermined period of time.

10. The method as claimed in claim 1, wherein run times of the containers are taken into account between the treatment devices.

11. The method as claimed in claim 1, wherein at least one treatment device is selected from a group of devices including moulding devices for moulding plastic preforms into plastic containers, filling devices for filling containers, transport devices for transporting containers, sterilisation devices for sterilising containers, closing devices for closing containers with caps, labelling devices for labelling containers, combinations therefrom.

12. The method as claimed in claim 1, wherein in an association of at least one of the plurality of test characteristic values with at least one of the plurality of reference characteristic values, a degree of fuzziness is taken into account.

13. A container treatment system comprising a first treatment device that treats containers in a first predefined manner, a second treatment device that is disposed after the first treatment device in the transport direction of the containers and that treats the containers in a second predefined manner, the first treatment device comprising a first sensor unit that records at least one first reference characteristic value that is characteristic of the treatment of the containers with the first treatment device, the second treatment device comprising a second sensor unit that records at least one second reference characteristic value that is characteristic of the treatment of the containers with the second treatment device, and having a storage unit for storing the at least one first and second reference characteristic values, wherein said storage unit allows an association of time values with the at least one first and second reference characteristic values, wherein said time values are characteristic of the point in time or the period of time of the occurrence of the at least one first and second reference characteristic values, wherein a comparison unit is provided which enables a comparison of a plurality of recorded test characteristic values with the at least one first and second reference characteristic values, as well as a processor unit that outputs at least one piece of information on the basis of such a comparison, which information is characteristic of the determination of a present or future fault condition of the container treatment system, wherein at least one of the plurality of recorded test characteristic values or the at least one first and second reference characteristic values are logically linked to each other for outputting the at least one piece of information, a same sensor unit of the first and second sensor units determining the at least one of the test characteristic values and the at least one of the plurality of reference characteristic values, wherein a linking of the first and second reference characteristic values with the time values associates the fault condition of the container treatment system with at least one of the test characteristic values to carry out an automatic or semi-automatic search of a pattern of the test characteristic values for a determination of the fault condition, wherein a certain test characteristic of the plurality of test characteristic values determined at a downstream device of the second treatment device has associated therewith at least one test characteristic value determined at an earlier point in time on a machine that is upstream of the downstream device of the container treatment system, and wherein a performance level of the machine upstream of the downstream device is reduced or increased in response to the determination of the fault condition and a corresponding increase or decrease in a production output of the downstream device.

14. The method as claimed in claim 1, wherein at least one of said first and second treatment devices treats the containers on the basis of the test characteristic values and is open or respectively closed loop controlled.

15. The method as claimed in claim 1, wherein a teach-in process for the container treatment system is carried out automatically or semi-automatically.

16. The method as claimed in claim 9, wherein the statistic method is used in order to detect the patterns in acquired data or respectively the reference characteristic values or the test characteristic values and if the container treatment system has detected certain patterns of the patterns, then these certain patterns will be learned.

17. The method as claimed in claim 1, wherein on many machines of the container treatment system and for many patterns, levels of suspicious patterns may be defined, the occurrence of which will cause the level to rise or which respectively indicate a certain fault situation wherein this level is visualized and is used as a warning to the operator in relation to what degree of criticality the treatment system is or respectively runs under at that moment in time.

18. A method for operating a container treatment system, wherein containers are treated by a first treatment device of this container treatment system in a first predefined manner, are subsequently transported from said first treatment device to a second treatment device of the container treatment system and are subsequently treated by the second treatment device in a second predefined manner, wherein by means of first sensor units, a first plurality of first reference characteristic values are recorded, which are characteristic of the treatment of the containers with the first treatment device, and by means of second sensor units, a second plurality of second reference characteristic values are recorded, which are characteristic of the treatment of the containers with the second treatment device, and wherein the plurality of first and second reference characteristic values are stored in a storage unit, wherein:

the first plurality of first reference characteristic values and second plurality of second reference characteristic values are each detected and recorded with a time value that is characteristic of the temporal occurrence of a respective reference characteristic value of the first and second reference characteristic values, a plurality of test characteristic values are recorded, as a result of a comparison between at least one of said plurality of test characteristic values and at least one of said plurality of reference characteristic values at least one piece of information is output that is characteristic of the determination of a present or future fault condition of the container treatment system, at least one of the plurality of test characteristic values or the reference characteristic values relating directly to the containers are logically linked to each other for outputting the at least one piece of information, a same sensor unit of the first and second sensor units determining the at least one of the test characteristic values and the at least one of the plurality of reference characteristic values;

a linking of the first and second reference characteristic values with the time values associates the fault condition of the container treatment system with at least one of the test characteristic values to carry out an automatic or semi-automatic search of a pattern of the test characteristic values for a determination of the fault condition, all of the recorded reference characteristics are at least partially considered to be overall information or an overall picture in order to teach an artificial intelligence of a machine of the container treatment system on the basis of the overall information, and a performance level of the first treatment device upstream of the second treatment device is reduced or increased in response to the determination of the fault condition and a corresponding increase or decrease in a production output of the second treatment device.

19. A container treatment system comprising a first treatment device that treats containers in a first predefined manner, a second treatment device that is disposed after the first treatment device in the transport direction of the containers and that treats the containers in a second predefined manner, the first treatment device comprising a first sensor unit that records at least one first reference characteristic value that is characteristic of the treatment of the containers with the first treatment device, the second treatment device comprising a second sensor unit that records at least one second reference characteristic value that is characteristic of the treatment of the containers with the second treatment device, and having a storage unit for storing the at least one first and second reference characteristic values, wherein said storage unit allows an association of time values with the at least one first and second reference characteristic values, wherein said time values are characteristic of the point in time or the period of time of the occurrence of the at least one first and second reference characteristic values, wherein a comparison unit is provided which enables a comparison of a plurality of recorded test characteristic values with the at least one first and second reference characteristic values, as well as a processor unit that outputs at least one piece of information on the basis of such a comparison, which information is characteristic of the determination of a present or future fault condition of the container treatment system, wherein at least one of the plurality of recorded test characteristic values or the at least one first and second reference characteristic values are logically linked to each other for outputting the at least one piece of information, a same sensor unit of the first and second sensor units determining the at least one of the test characteristic values and the at least one of the plurality of reference characteristic values, and wherein a linking of the first and second reference characteristic values with the time values associates the fault condition of the container treatment system with at least one of the test characteristic values to carry out an automatic or semi-automatic search of a pattern of the test characteristic values for a determination of the fault condition, wherein all of the recorded reference characteristics are at least partially considered to be overall information or an overall picture in order to teach an artificial intelligence of a machine of the container treatment system on the basis of the overall information, and a performance level of the first treatment device upstream of the second treatment device is reduced or increased in response to the determination of the fault condition and a corresponding increase or decrease in a production output of the second treatment device.

* * * * *